Figure 11:
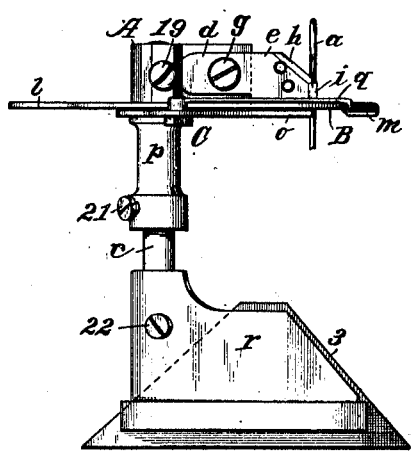

J. S. CRANE.
KNITTING MACHINE.
APPLICATION FILED JUNE 16, 1904.
1,027,034.
Patented May 21, 1912.
9 SHEETS—SHEET 1.
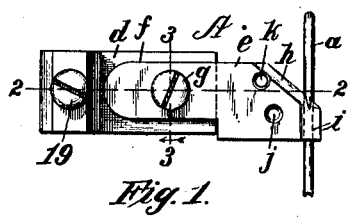
Fig. 1.
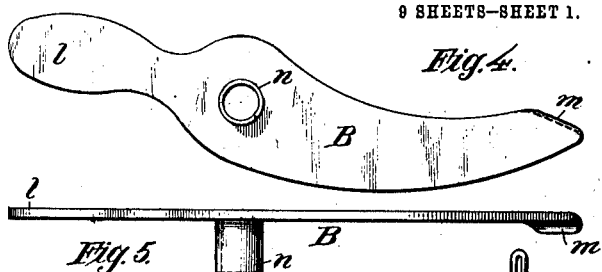
Fig. 4.
Fig. 5.
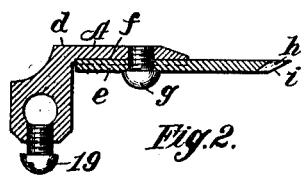
Fig. 2.
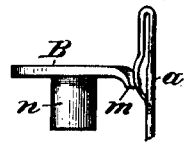
Fig. 6.
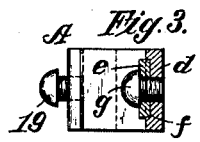
Fig. 3.
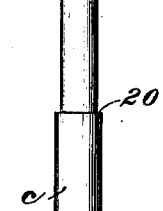
Fig. 7.
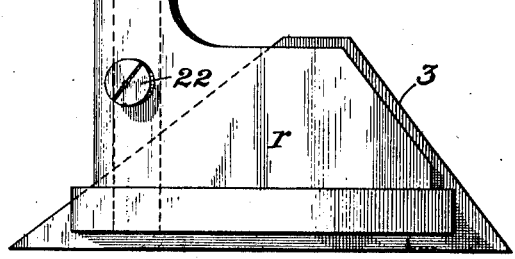
Fig. 9.
Fig. 8.
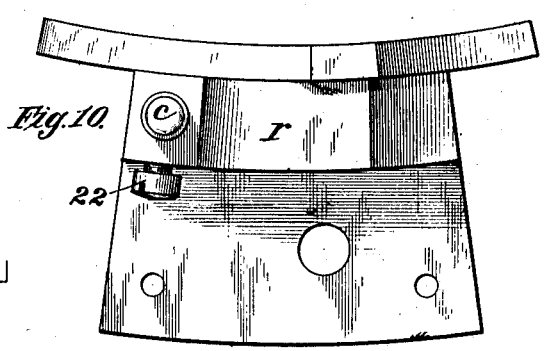
Fig. 10.
1 Inch.
WITNESSES:
H. S. Austin
Laurince C. Janney
INVENTOR
John S. Crane
BY
ATTORNEY

J. S. CRANE.
KNITTING MACHINE.
APPLICATION FILED JUNE 16, 1904.

1,027,034.

Patented May 21, 1912.
9 SHEETS—SHEET 2.

1 Inch.

WITNESSES:
H. S. Austin
Laurence A. Janney.

INVENTOR
John S. Crane
BY
his ATTORNEY

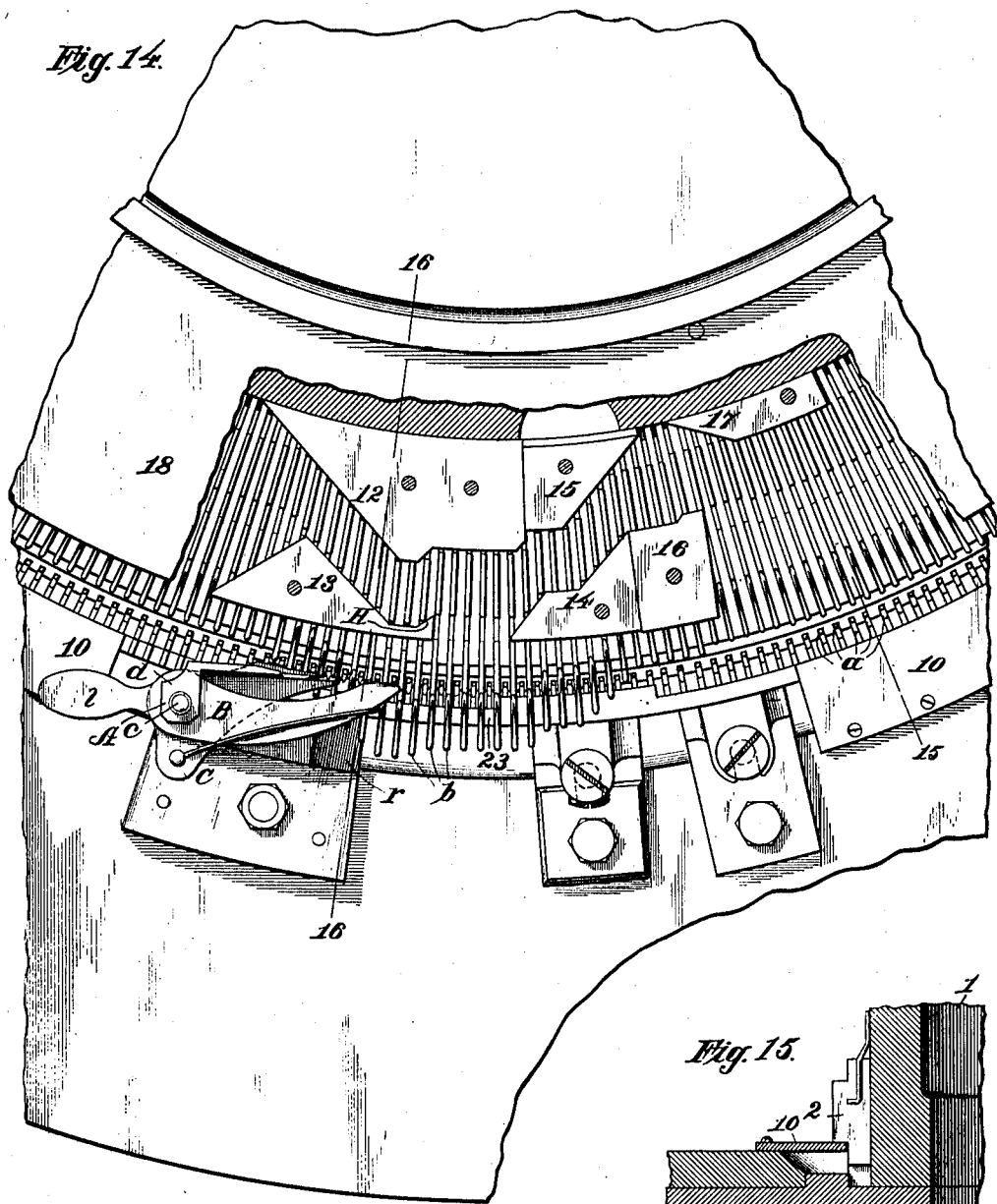

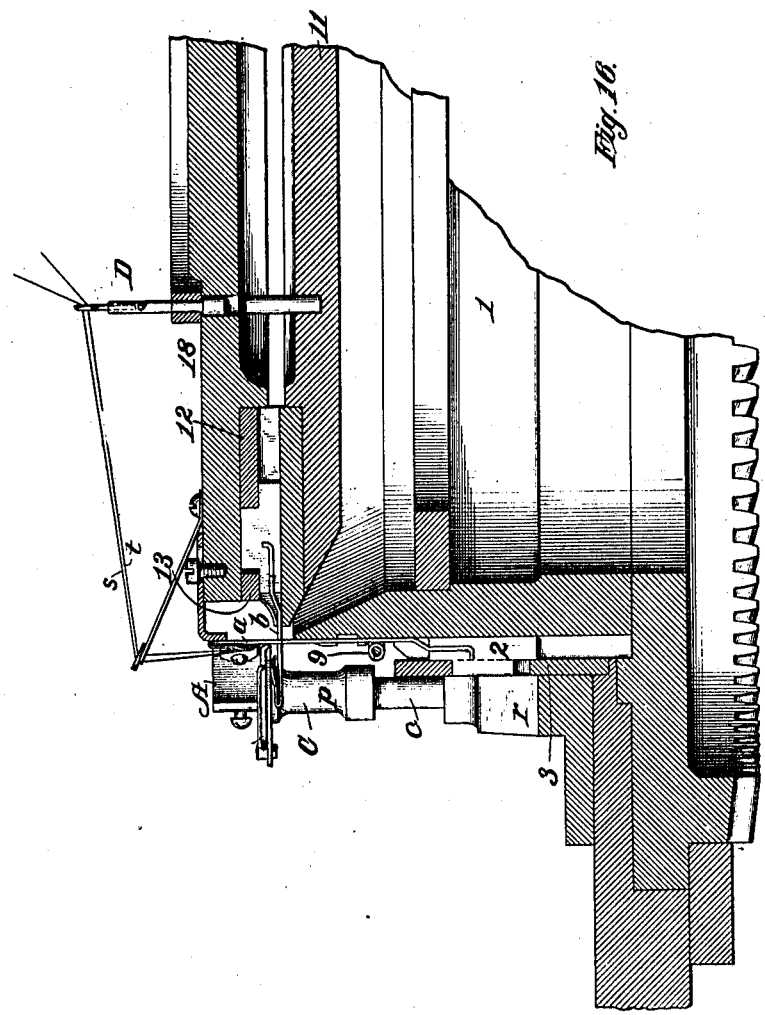

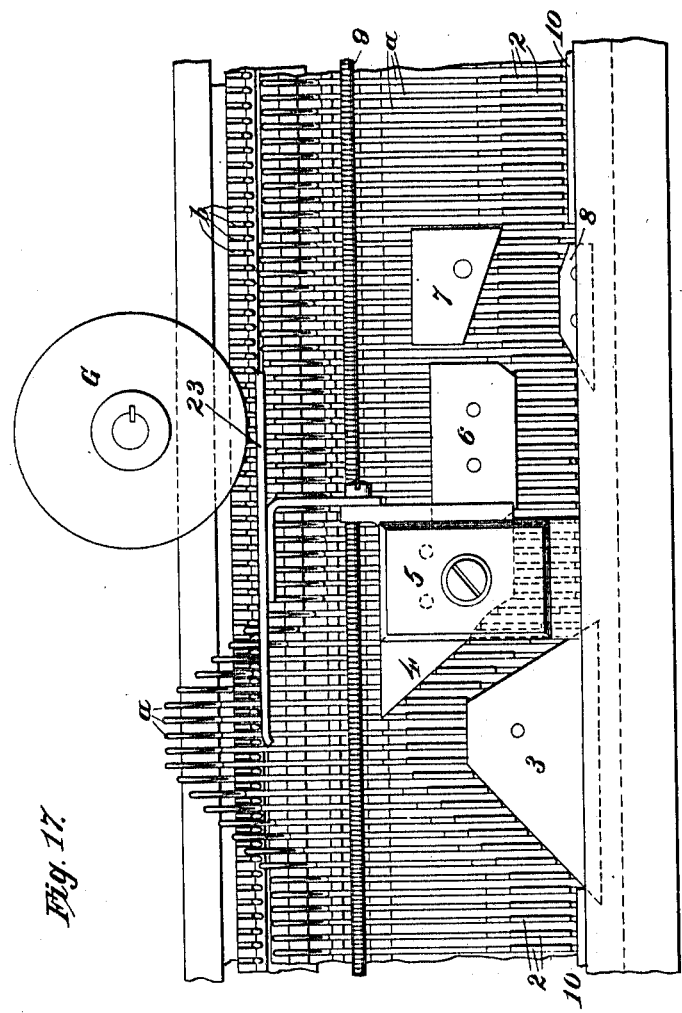

J. S. CRANE.
KNITTING MACHINE.
APPLICATION FILED JUNE 16, 1904.

1,027,034.

Patented May 21, 1912.
9 SHEETS—SHEET 6.

WITNESSES:

INVENTOR
John S. Crane
BY
ATTORNEY

J. S. CRANE.
KNITTING MACHINE.
APPLICATION FILED JUNE 16, 1904.

1,027,034.

Patented May 21, 1912.

9 SHEETS—SHEET 7.

WITNESSES:
H. S. Austin
Laurence A. Janney

INVENTOR
John S. Crane
BY
Arthur ____ Brown
_____ ATTORNEY

J. S. CRANE.
KNITTING MACHINE.
APPLICATION FILED JUNE 16, 1904.

1,027,034.

Patented May 21, 1912.
9 SHEETS—SHEET 8.

WITNESSES:
H. S. Austin
Laurence A. Janney

INVENTOR
John S. Crane
BY
his ATTORNEY

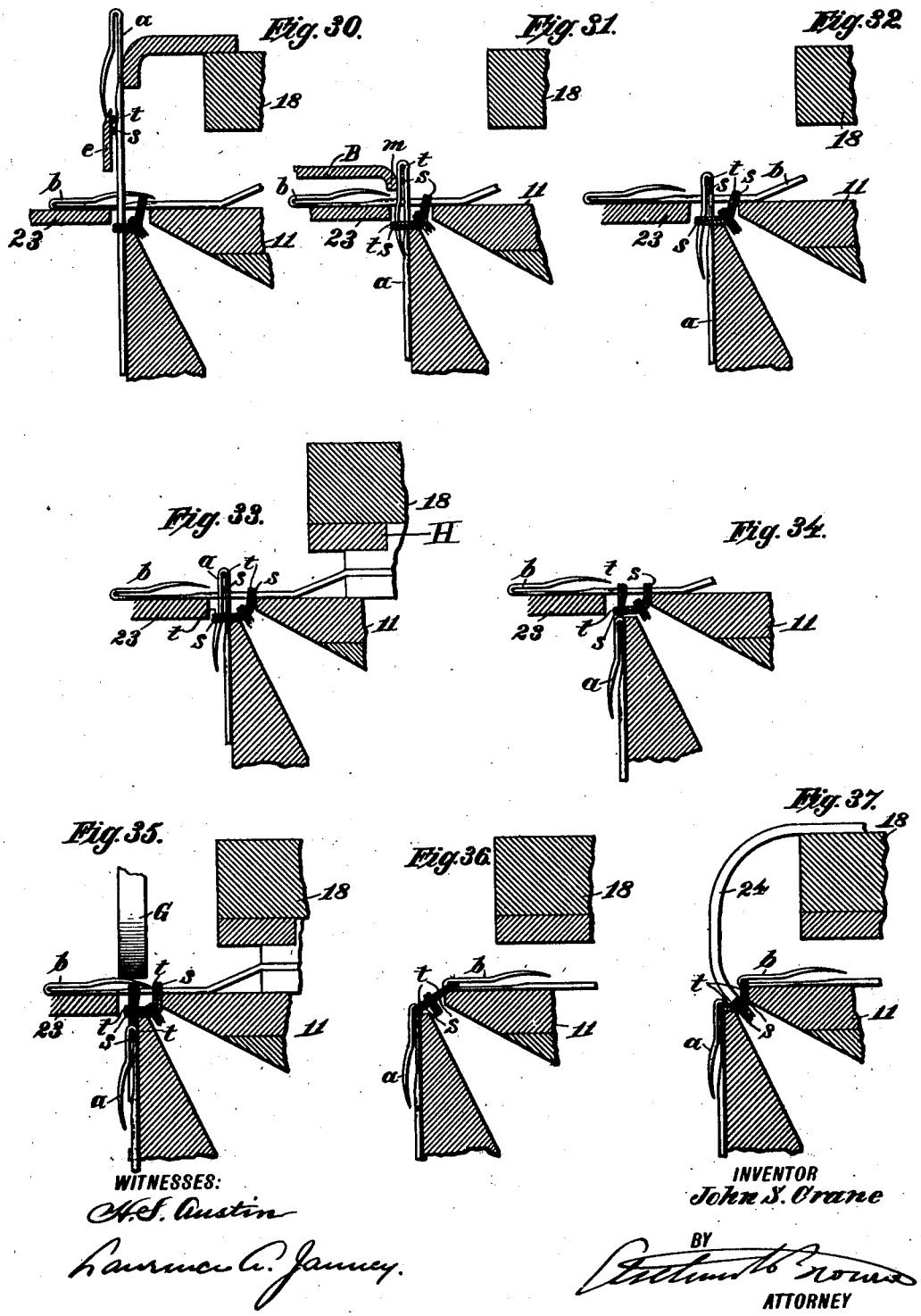

UNITED STATES PATENT OFFICE.

JOHN S. CRANE, OF LACONIA, NEW HAMPSHIRE, ASSIGNOR TO CRANE MANUFACTURING COMPANY, OF LAKEPORT, NEW HAMPSHIRE, A CORPORATION OF NEW HAMPSHIRE.

KNITTING-MACHINE.

1,027,034.  Specification of Letters Patent.  Patented May 21, 1912.

Application filed June 16, 1904. Serial No. 212,817.

*To all whom it may concern:*

Be it known that I, JOHN S. CRANE, a citizen of the United States, residing in Lakeport, in the city of Laconia, county of Belknap, and State of New Hampshire, have invented certain new and useful Improvements in Knitting-Machines, of which the following is a specification.

My invention accomplishes a twofold end: (1) The number and complexity of parts of a knitting machine are materially reduced while its efficiency is increased; and (2) the well-known knitting machine employing spring-bearded needles is enabled to produce a fabric composed of two species of yarn, the surfaces of the fabric presenting yarn of one variety while the body of the fabric is formed of the other. Both of these attainments are of great value to the art to which they relate; the first because it lessens the liability of the operating machine to interruption occasioned by the failure of its many and intricate parts properly to coöperate; and the second because greatly simplified devices are applied to the production of a fabric which hitherto has been impossible of production except by the use of the most complicated mechanisms.

My improvements may be applied to different types of knitting machines. They will be shown herewith as embodied in an independent needle circular dial knitting machine. The use of my improvements upon machines of another character might necessitate certain alterations in the specific forms shown in the present drawings, but such alterations would entail mere mechanical skill and would in no way impair the extent of my invention as including such use.

To promote brevity, only such parts as are necessary to be shown in connection with the present improvements will be illustrated in the accompanying drawings.

Figure 12:
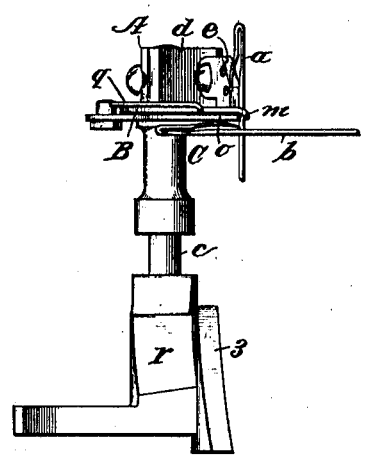
Figure 13:
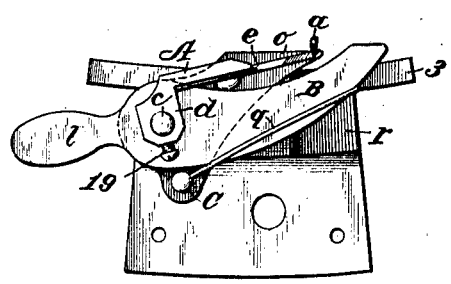
Figure 18:
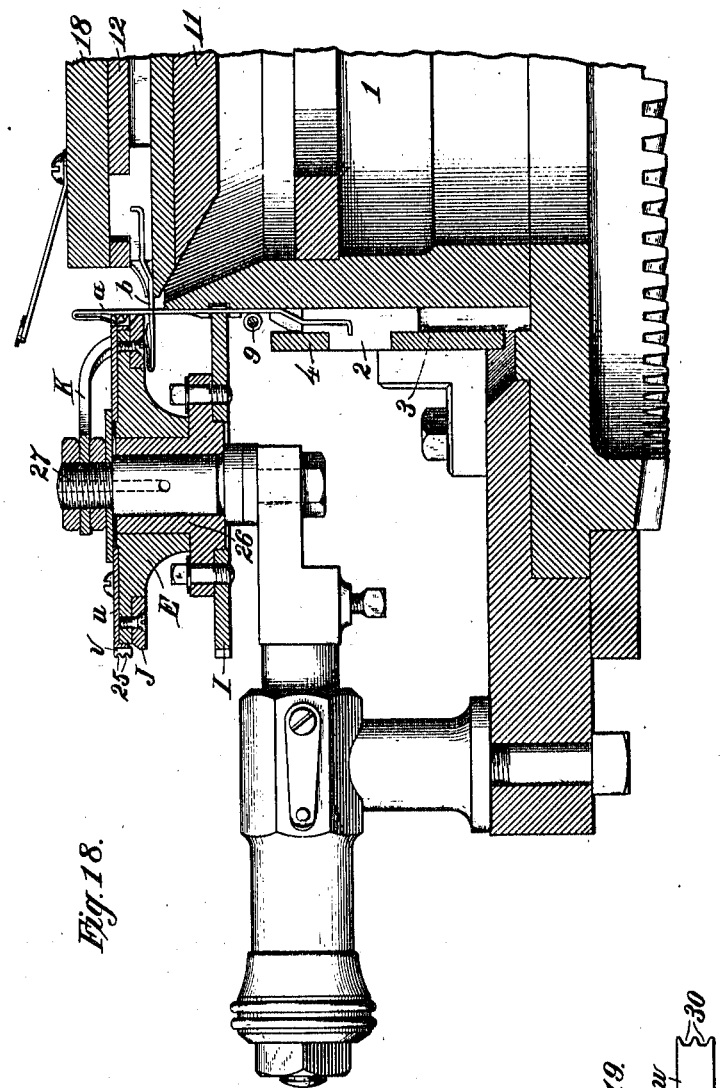
Figure 19:
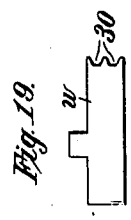
Figure 20:
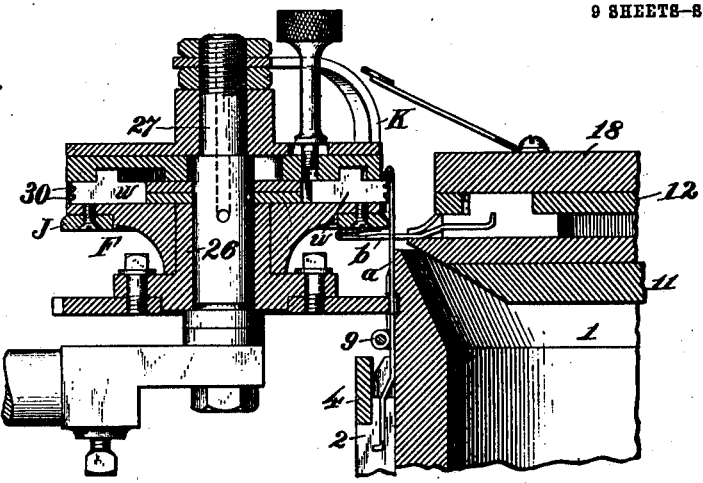
Figure 21:
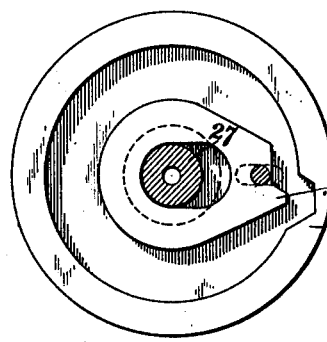
Figures 22, 23:
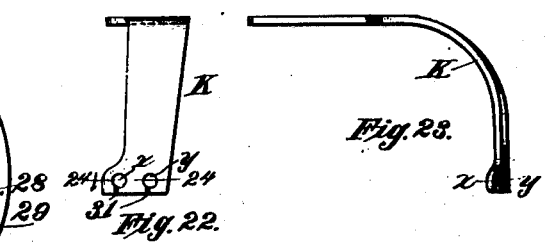
Figure 24:
Figure 25:
Figure 26:
Figure 27:
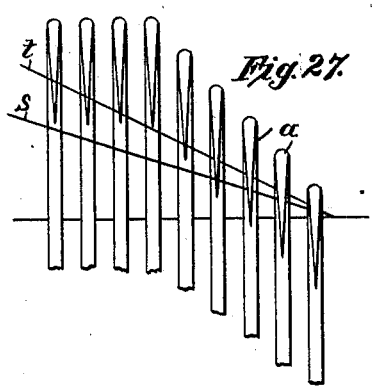
Figure 28:
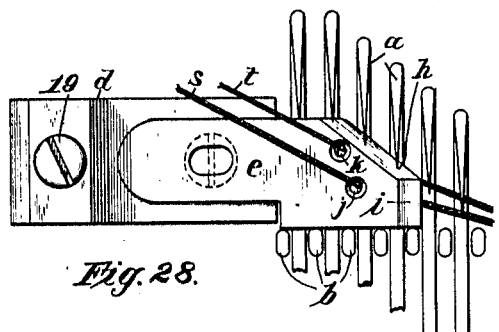
Figure 29:
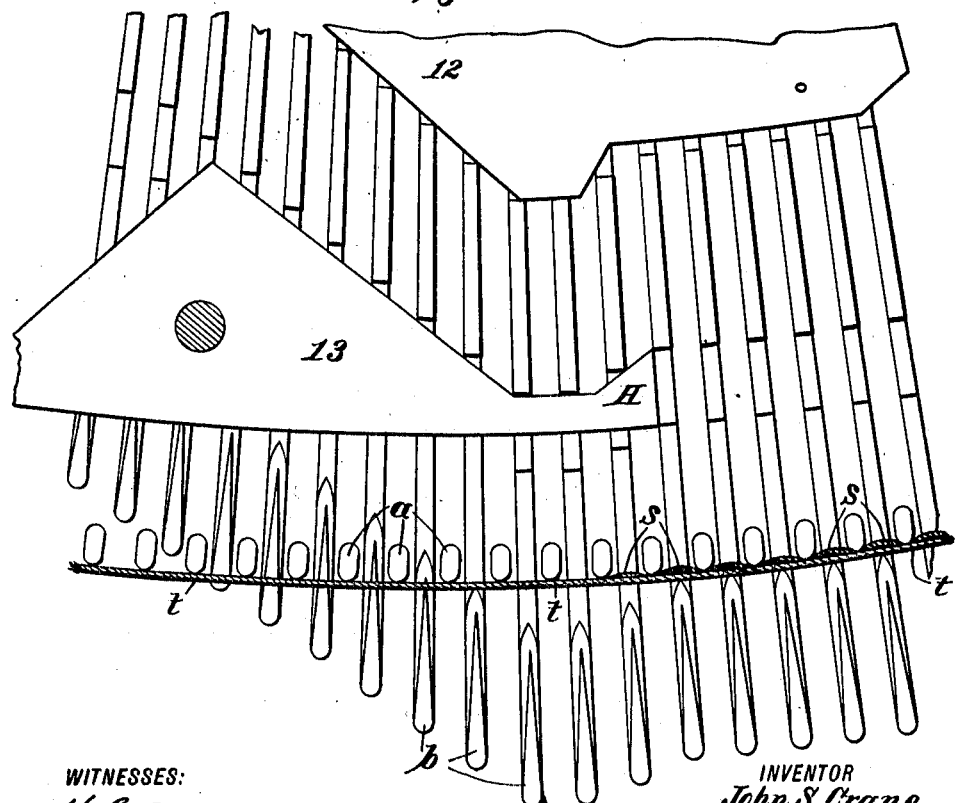

In the drawings, Figure 1 is a side elevation of the combined yarn-guide and yarn-feed. Fig. 2 is a horizontal section along the line 2—2 of Fig. 1. Fig. 3 is an end elevation partly in section, along the line 3—3 of Fig. 1. Fig. 4 is a plan view of the main-needle presser. Fig. 5 is a side elevation of the same. Fig. 6 is an end elevation of the same showing the position of the pressing surface relative to one of the main needles. Fig. 7 is a plan view of the main needle support. Fig. 8 is a side elevation of the same. Fig. 9 is a side elevation of the post upon which the foregoing instrumentalities are positioned, together with its supporting base. Fig. 10 is a plan view of the same. Fig. 11 is a side elevation of the parts shown in the foregoing figures, assembled in their proper relations. Fig. 12 is an end elevation of the same. Fig. 13 is a plan view of the same. Fig. 14 is a plan view of a portion of the knitting machine, certain parts being broken away to disclose the cams which actuate the ribbing needles. Fig. 15 is a vertical section, along the line 15—15 of Fig. 14. Fig. 16 is a vertical section of a portion of the knitting machine along the line 16—16 of Fig. 14. Fig. 17 is a front elevation of that part of the machine shown in Fig. 14, certain parts being omitted to disclose the cams which actuate the main needles. Fig. 18 is a vertical section of the machine showing the use of a toothed feed-wheel. Fig. 19 is a side elevation of one of the sliding blades employed in that type of feed-wheel shown in Fig. 20. Fig. 20 is a vertical section of the machine, similar to that of Fig. 18, showing a feed-wheel employing sliding blades. Fig. 21 is a horizontal section of the feed wheel, showing the cams which cause the reciprocation of the sliding blades shown in Fig. 19. Fig. 22 is an end elevation of a yarn-guide conveniently employed in connection with the feed-wheels shown in Figs. 18 and 20. Fig. 23 is a side elevation of the same. Fig. 24 is a section along the line 24—24 of Fig. 22. Fig. 25 is a diagrammatic horizontal section of several main needles showing the manner of sinking yarn between said needles. Fig. 26 is a diagrammatic horizontal section of several main needles showing the manner of laying yarn against the shanks of said needles, as distinguished from sinking the yarn therebetween. Fig. 27 is a diagrammatic front elevation of several of the main needles showing the direction of travel of two strands of yarn. Fig. 28 is a diagrammatic front elevation of the combined yarn-guide and yarn-feed, shown in Fig. 1, showing the manner in which yarn is laid against the main needles. Fig. 29 is a diagrammatic plan view of a portion of the machine showing the manner in which two strands of yarn are laid upon the ribbing needles. Figs. 30 to 37 are diagrammatic sectional views, along successive radial planes of the machine, showing the knitting operation in its various principal stages.

The improvements are illustrated in the drawings as embodied in a machine of the type wherein the needles and their carriers rotate, while their actuating devices and the feeds are mounted on fixed supports. The following description will be based upon the specific organization and construction illustrated, leaving all suggestions of modifications until the specific mechanism has been fully described.

In the various figures, $a$ $a$ are the main needles, and $b$ $b$ are the ribbing needles, both being spring or beard needles. The needles $a$ $a$, as shown, are carried upon a rotating cylinder 1, upon the periphery of which they are attached in such manner as to permit them to reciprocate vertically under the influence of the cam surfaces 3, 4, 5, 6, 7 and 8, (see Fig. 17) which engage with the projecting nibs 2. As shown, these needles $a$ $a$ are conveniently equipped with jacks in which the needle shanks are secured and which bear projecting nibs 2, and below the nibs are feet of reduced width as compared with the width of the nibs. The needles $a$ $a$ are maintained in position, against the periphery of the cylinder, in part by an elastic band 9 which encircles them near the top of the cylinder. While they are in engagement with their cams, the lower ends of these needles $a$ $a$ are held in place against the cylinder 1 by the side faces of the cam plates (see Figs. 16 and 18). When they have left the cams, their lower ends or reduced feet are held in place against the cylinder by the retainer 10 shown in Figs. 14, 15 and 17. This retainer 10 is conveniently given the form of a flat plate, secured to the fixed bed plate of the machine, which embraces the series of feet of the needle jacks at their lowermost ends between adjacent knitting points. This is a highly effective arrangement which insures the proper carriage of the needles by the cylinder, avoids accidental displacement and breakage of needles, and at the same time permits the easy removal and replacement of injured needles, which may be effected by simply lifting a needle above the retainer 10, when opposite a vacancy between cams, and then drawing it out from under the spring band 9. The ribbing needles $b$ $b$ are carried by the rotating dial 11 and are adapted to be reciprocated radially on said dial by cams 12, 13, 14, 15, 16 and 17 (Fig. 14) which are mounted upon (and beneath) a normally stationary cam or cap-plate 18 which is superimposed above the dial 11, and supported in any convenient manner.

The machine is preferably equipped with a plurality both of yarn feeds and of needle actuating devices, but since these several sets of mechanisms are just alike it will suffice to describe a single set. The general disposition of these several sets of mechanisms is sufficiently well-known to demand no discussion.

Conveniently situated upon the bed-plate of the machine are as many of the posts $c$ as there are sets of knitting cams. Each post $c$ carries the combined yarn-guide and yarn-feed A, the presser B and main needle guard C. The yarn-guide and yarn-feed A is conveniently formed of two parts, a body $d$, comprising a sleeve adapted to fit over the post $c$, and a finger $e$ one end of which is longitudinally adjustable in a slideway in the body $d$ (see Figs. 1, 2 and 3) by means of the slot $f$ and the shoulder screw $g$. The outer end of the finger $e$, constituting the terminal of the yarn feed, is provided with an oblique beveled surface $h$ and a communicating end bevel $i$. When the guide A is in its proper position relative to the needle $a$ $a$, the spring beard of each of said needles, during a part of its descending course actuated by the draw-in cam 4, will bite over the upper edge of the bevel $i$, being thereby distended for an instant (see Figs. 1, 11, 12, 13 and 16). The finger $e$, is equipped with two in-leading eyes $j$ and $k$, which receive and guide the yarns from their source to their proper engagement with the needles $a$ $a$. Either of the eyes $j$, $k$, may be used alone when it is desired to knit from a single strand of yarn. The sleeve $d$ bears a screw 19 whereby it may be secured against motion on the post $c$.

The presser B may be of any convenient shape and has preferably a handle portion $l$ and a pressing surface $m$ (see Figs. 4, 5 and 6). The pressing surface $m$ is designed to present a polished curved surface to the beard of a descending needle $a$, as shown in Figs. 6 and 14, and gradually to close the beard of said needle during its descent. As shall be shown presently the presser B exerts a yielding pressure of sufficient strength to close the beard of the needle, but which yields to irregular conformations in the needles and obviates the nice adjustment necessary in the use of a rigid presser wheel such as is commonly employed. The presser B bears also a sleeve $n$ which fits easily on the post $c$ and seats, at its lower extremity, upon a shoulder 20 of the said post.

The main needle guard C comprises a flat plate $o$ and a sleeve $p$ (see Figs. 7 and 8). A spring $q$, which actuates the yielding presser B, is conveniently secured at a point on the said plate $o$ by means of a screw post and lock-nut whereby the tension of the spring may be varied at will. The sleeve $p$ is easily movable upon the post $c$ and may be secured in position by any convenient means, such as the set-screw 21 shown in Figs. 8 and 11. When the main needle guard C is in its proper adjustment the straight edge of the plate o will be positioned in close proximity to the line of travel of the main needles a (see Figs. 13 and 14), and will afford support for the said main needles against the strain upon them exerted through the yarn by the ribbing needles b during their outward progress. If a tight stitch, a bunch or a tangle should occur in the yarn, the outward movement of the ribbing needles would tend to drag the yarn with them, and consequently to bend the main needles outwardly away from the cylinder, and the strength of the elastic band 9 would probably not be sufficient to overcome this tendency. The main needle guard C, however, maintains the main needles in their proper positions, thereby insuring the drawing of uniform stitches, and preventing injury to the needles.

The yarn guide A and the guard C may be withdrawn from engagement in the operation of the machine by loosening the screws 19 and 21 in the sleeves d and p, respectively, and revolving them upon the post c until they have swung clear of the reciprocating needles. The presser B may be disengaged by freeing it from the spring q and rotating it upon the post c. The handle portion l supplies to the operator means for so rotating the presser B. The above described parts, A, B and C, may be withdrawn from engagement collectively by loosening the screw 22 and rotating the post c in its base.

The facility with which the yarn-guide and yarn-feed A, and the presser B, may be withdrawn from operation either singly or together is of importance. It is convenient to knit at a plurality of knitting points and frequently it may become desirable to render the knitting devices collectively inoperative at one of said points without interfering with the continuous operation at other points. Moreover, it is at times desirable to remove from operation a single member of these devices at a knitting point. This is true, for example, in knitting certain fabrics which are desired to be of different textures at different places. If the main needle presser at one knitting point be withdrawn from operation, without affecting the feed, the feed of the yarn at that point will continue and successive new loops will be formed on the needle shanks. These new loops will, however, not be discharged until the needles have been acted upon by the presser at the next knitting point, where, before their discharge, another loop will have been introduced and the two together will form a composite loop which will be cast off as one, thereby giving variety to the fabric. The present improved constructions and arrangements of parts accomplish the above indicated purposes effectually and easily.

The post c is positioned in a block r of any convenient form, suitably secured to the bed-plate of the machine. Said block r affords support for the cam plate 3 which may be secured thereto as shown in Figs. 9, 10 and 12.

The above described parts are manifestly simple, effective, of durable construction, and easy of introduction to or withdrawal from engagement with the knitting needles. They may be employed in the production of fabric from a single yarn or from two yarns of the same or different species or colors.

In knitting with the improved machine, yarn is led from a bobbin or other source, preferably through a stop-motion detector (indicated at D, Fig. 16), thence through one of the eyes j, k, of the yarn-guide and yarn-feed A, as shown in Fig. 16. The way in which the yarn, issuing from the yarn-guide and yarn-feed A, is laid upon the main needles a, a, is of great importance. In the art to which the present invention relates it has been a common practice to introduce yarn to the main needles by thrusting the strands into the interstices between the main needles by means of a sinker mechanism, thereby forming loops in the yarn in the manner shown in diagram in Fig. 25. Thus the strands were given considerable slack and the yarn was subjected to strains which sometimes resulted in breakage, especially when tender or fine yarns were employed. By the present improved devices, however, it is possible to secure the proper engagement of the yarn by the main needles without recourse to the sinking operation. The yarn, conducted by the yarn feed A to a point contiguous to the needles, is laid against the shanks of the said main needles a a (as shown diagrammatically in Figs. 25 and 30), and there retained until it has been embraced by the needle beards. This end is accomplished in a convenient and simple manner by the combined yarn-guide and yarn-feed A, already described, which is shown with particular clearness in Figs. 1, 2, 3 and 30.

A signal advantage is derived from this laying on of the yarn as distinguished from looping-in or sinking it between the main needles. The strain to which the yarn is subjected is small, permitting the use of fine soft yarns which otherwise would give trouble by frequent breakage. Moreover, needles of any desired fineness may be employed and they may be positioned nearer together than would otherwise be expedient, since the strain upon them is greatly reduced, and since it is unnecessary to allow for the projection of sinkers and yarn between them. Hence a fabric of very fine texture may be produced. It is readily apparent that this plan of yarn taking may be applied with equal advantage to machines employing coarse needles and knitting coarse yarns.

The laying on of the yarn, as distinguished from sinking it between the main needles, is of importance in knitting fabric from two yarns as hereinafter set forth.

At an early stage in the knitting operation it is important to elongate the fresh yarn into loops in order that a sufficient length may be drawn in to allow for intermeshing with the previously knitted loops. It is important that these new loops be of uniform size and that they be formed without undue strain on the yarn. This looping has commonly heretofore been effected by means of the sinking operation described above, (shown in diagram in Fig. 25) in which each loop was formed by a single thrust of a sinker blade. The projection of a sinker blade between a pair of the main needles, bending in an entire loop at a single thrust, occasioned a sudden strain upon the yarn and caused it to take a meandering path in a plane substantially parallel to that of the dial 11. The subsequent positions of these loops (when about to be drawn through previously formed loops) was substantially perpendicular to their original plane. Hence the strand of yarn, in this old sinking operation, was subjected first to a sudden strain in one direction, and then to a further strain, in an entirely different direction, which was strongly resisted by the interengaging sinkers and main needles holding the yarn between them in its winding path (see Fig. 25). This was quite likely to stretch and injure, if not to break, the yarn, especially when tender or fine varieties were being knitted.

In accordance with the present invention the loops are formed by the passage of the main needles through the spaces between the ribbing needles after the yarn has been laid against the shanks of the main needles. The path of the yarn through the yarn-guide A, until it meets the first ribbing needle, is in substantially a straight line with no material bends therein, and the initial formation of a loop is by a pull of a main needle through the space between adjacent ribbing needles in a line not diverging materially from the direction in which the yarn is already traveling (see Figs. 26 and 27). Thus the strains on the yarn are applied gradually and the yarn is subjected to less friction by reason of having a direct path.

The foregoing steps in the knitting (i. e., (1) laying yarn against the main needles, and, (2) looping the yarn) are accomplished by the instrumentalities described above as embodying this invention in the following manner. First to be considered is knitting from a single strand of yarn. As the main needles $a$, $a$, rotate, carried by the cylinder 1, their action begins when the nibs 2 of their jacks strike the inclined throw-out cam-face of the plate 3. Hereupon the needles gradually ascend until they reach the upper horizontal cam-face of the plate 3 (see Fig. 7). At this point, while the main needles $a$ $a$ are at their extreme positions of upward movement, the introduction of the yarn begins. The combined yarn-guide and yarn-feed A is in position with its terminal close to the shanks of the needles $a$ $a$. The lower ends of the needle beards are at some little distance above the guide A (see Fig. 11). Yarn issues from one of the eyes $j$, $k$, upon the inner face of the terminal $e$ of the guide A, and is thus laid against the needle shanks. The continuous rotation of the cylinder 1 carries the needles beneath the draw-in cam 4, whereupon the beard of each needle, during its descent, bites over the bevel $i$ of the guide A and remains distended for an instant until it has descended far enough to embrace the strand of yarn (see Figs. 1, 12 and 28). The beards of the needles should be normally distended to some extent from the shanks of the needles by their elasticity and if this distension could be relied upon in every instance the interengagement of needle and yarn would probably occur in any case when the strand is presented close to the needle shank. It is convenient, however, to have the needle bite over the bevel $i$ as abundant precaution against dropping or skipping a stitch should any needle fail properly to embrace the strand or strands of yarn. Dropped stitches and mal-engagement of yarn by a needle are entirely precluded by the biting over action of the beard on the bevel $i$, since thereby the terminal $e$, bearing the yarn on its inner face, is forcibly interposed between beard and shank as they descend, and remains interposed therebetween until the needle has descended so low as to render impossible the escape of the yarn from its beard. Being thus caught by the beard of the descending needle the yarn is in perfect engagement and is ready for the looping operation which next takes place. Simultaneously with the upward projection of the main needles $a$, $a$ by the cam plate 3, the ribbing needles $b$ $b$ have been thrust outward, between appropriate pairs of the main needles, by the action of the throw-out cam 12 (see Fig. 14). Hence when the main needles $a$, $a$ occupy their extreme positions of upward travel, corresponding ribbing needles $b$, $b$ occupy their extreme positions of outward radial movement on the dial 11. Those ribbing needles beneath the yarn-guide and yarn-feed A rest upon and are supported by the support 23, having been protruded outwardly beyond the dial verge to such a distance that the yarn, when it is brought down by the descending main needles, will be laid upon the shanks of the ribbing needles back of the beards. In this position the needles $b$ $b$ dwell during the next stage of the knitting. Thus when the elongation of the yarn into loops takes place, the needles a, a are descending and the needles b, b have been projected outwardly to their extreme positions. The course of this looping may best be observed in profile in Figs. 33, 34 and 35, and in elevation in Fig. 27. Each of the main needles a, a in its descent lays the strand of yarn upon the shank of the next adjacent ribbing needles b, b and, descending farther, begins to draw the said strand downward between two ribbing needles, forming a loop in the yarn. The preceding main needles a, a have at this point descended successively lower and lower each carrying down its loop longer than that of the next following needle. In this manner each loop is drawn down to its desired length by the gradual steady pull of a main needle. The draw-in cam 5 which actuates the downward movement of the main needles is readily adjustable permitting the length of loop to be made to be determined to a nicety and to be altered at will. The pull on the yarn by successive main needles a, a during the looping, is at no time sudden or excessive as in the case of the sinking operation above referred to, but on the contrary increases slowly by slight gradations from zero to its maximum. As the yarn is pulled it slides easily over the polished shanks of the ribbing needles b, b and is subjected to minimum friction. It is readily apparent that the yarn is led into the final steps of the knitting by a substantially direct path, securing thereby diminished resistance to easy manipulation by the needles (see Fig. 27). The downward strain of the yarn upon the ribbing needles is counteracted by a supporting plate such as 23 (Fig. 17) which forms an effective brace and permits the employment of very fine needles which otherwise would be bent so far downward as to interfere with proper knitting and to destroy uniformity in length of loops.

Previous to entering upon the above steps in the knitting operation, each main needle a, a bears upon its shank, near to the dial verge, an old loop formed at the preceding knitting point. During a part of its descending course the beard of each main needle is closed by the presser B (the point of the beard entering the usual groove or "eye" in the shank) and the new yarn inclosed within the beard is drawn down and through the old loop, on the needle shank, which is cast off as the needle reaches its lowermost position (see Figs. 31 to 24). Similarly, each ribbing needle b, b carries an old loop. When the yarn has been drawn down between the ribbing needles, into loops of the proper length, said ribbing needles each bear two loops, the old and the new, which are separated by a slight distance (see Fig. 34). Hereupon the draw-in cam 14 begins to act and the needles b, b retreat inwardly toward the center of the dial. When the point of the beard of a ribbing needle reaches a position intermediate between the old and the new loops on the ribbing needle shank, said beard is presented to the action of the ribbing needle presser G (Figs. 17 and 35) which incloses the new loop in the beard and permits it to be drawn through the old loop which is cast off as the needle progresses (see Figs. 35 and 36). The presser G may be of any suitable type and is preferably given the form of a wheel made transparent (as by being made of glass) so that the progress of the knitting may be observed therethrough. The new edge of the fabric, or "fell", may be conveniently pressed down within the cylinder, out of the way of the operating parts of the machine, by a fell-presser such as is shown at 24 in Fig. 37. The final steps of the knitting which have not herein been described in detail are carried on in the manner set forth in the aforesaid companion application.

Hitherto the description has been confined to a single use of the present improved devices, that of knitting from a single strand of yarn. It now becomes necessary to consider their application to the production of fabric from two species of yarn, one variety thereof being presented upon the surface of the fabric, the other forming the body. The simple and effective plan described above for laying the yarn against the main needles is important in this connection. In knitting from two strands it is desirable that the yarn be subjected to sufficient strain to prevent slack, but on the other hand severe strain should be guarded against, especially when soft fine yarn is being used. As shown above the old way of sinking the yarn between the main needles exerted a considerable strain on the threads and at the same time allowed slack. These difficulties are obviated by the present improved plan of laying on instead of sinking in the yarn. Thereby a slight strain is applied to the strands which is sufficient for the purposes of the knitting but which is not great enough to stretch, break or in any way injure the yarn. As will be disclosed hereinafter, the proper adjustment of this strain has an important bearing upon the method whereby the yarn is laid upon the ribbing needles b, b.

A single alteration in the machine as described above contributes to the production thereupon of a fabric composed of two species of yarn one of which is presented upon the surface of the fabric, the other forming the body. This alteration consists in the addition, to the cams which actuate the reciprocation of the ribbing needles b, b, of the preliminary draw-in-cam H, clearly shown in Figs. 14 and 29. The purpose of this preliminary draw-in cam will be elucidated in its proper connection. While it is desirable to employ this cam H in knitting from two strands of yarn, it is to be understood that such employment does not in any way interfere with the use of the machine for knitting from a single strand. A machine having such a cam as the draw-in cam H is equally well adapted to knit from one or from two strands.

For convenience in describing the production of the above indicated fabric from two different species of yarn, let it be supposed that one such yarn is of silk, lettered $s$, the other of cotton, lettered $t$, the silk being designed to form the surface of the fabric, the cotton the body. Each of the two strands is preferably led from its source through a stop-motion detector on its way to the combined yarn-guide and yarn-feed A. The silk yarn $s$ is threaded through the lower eye $j$, the cotton $t$ through the upper eye $k$. In the manner already described in connection with the single strand, these two yarns are engaged by a descending main needle (see Fig. 30). It is evident that the silk thread $s$ will occupy a position in the hook of the needle $a$ beneath the cotton strand $t$ (see Fig. 31). Hence in its descent the needle $a$ will bring the silk thread $s$ first into engagement with the shank of the appropriate ribbing needle $b$ which has been protruded at the proper moment by its actuating cams (see Fig. 32). At this point, when the lowermost strand $s$ (the silk, in the hypothetical case) has been seated upon the ribbing needle, the preliminary draw-in cam H acts, withdrawing the needle $b$ a slight distance inwardly toward the center of the dial 11. Concurrently the silk strand $s$ resting thereupon is drawn back by friction (see Fig. 33). At this point the importance of a properly adjusted strain upon the yarn becomes apparent. If the strain be too great the friction of the needle $b$ upon the silk strand $s$ will not be great enough to overcome said strain and draw back the thread; and, similarly, if the strain be too slight the silk will not rest against the needle shank with sufficient pressure to be drawn back by friction. It has been found in actual operation that the yarn passing through the yarn guide A, coming from a free moving bobbin, is subjected to the right strain for the effective operation of all the steps of knitting. When the descending needle $a$ brings down the cotton strand $t$, it will be laid upon the ribbing needle adjacent to and outside of the silk strand $s$. The preceding loop has, of course, been formed in the same manner and is found to consist of the cotton $t$ and silk $s$, the former positioned outside the latter (see Fig. 34). The ribbing needle bearing these loops, being further withdrawn by the action of the draw-in cam 14, is subjected to the action of the presser W, which depresses the beard and incloses within it the new loop consisting of the two strands (see Fig. 35). The ribbing needle being further withdrawn, the old loop is discharged, in the well-known manner, (the silk strand $s$ leaving last) to become a portion of the completed fabric of which the successive silk strands form the surface (see Fig. 36).

Other instrumentalities than those described above may be employed. The introduction of yarn by laying it on the main needles instead of sinking it between them, may be accomplished by feed-wheels such as are employed in the modification shown in Figs. 18, 20 and 21.

The feed-wheel E (Fig. 18) is fast to a sleeve 26 which turns on a vertical bearing or post 27 constituting a part of the frame for the feed-wheel. This bearing 27 is radially adjustable with reference to the axis of the needle cylinder 1, as shown at Fig. 18. Upon its upper face the wheel E bears an adjustable circular plate $u$ which carries the peripheral feed-teeth $v$. These teeth $v$ are equipped with two thread-receiving grooves 25 which may be used separately in knitting from a single yarn, or concurrently in knitting from two yarns. The feed wheel E is rotated through the instrumentality of a gear I which is secured in any convenient manner to the sleeve 26. This gear I meshes with the shanks of the needles $a$, so that as the cylinder is rotated, the needles act as teeth on the cylinder to impart rotation to the gear. This gear is rendered peripherally adjustable on the sleeve 26 in order the more readily to maintain the proper relation between the gear and needle shanks, and consequently between needles and feed-teeth. When the various parts of the feed-wheel E are in their proper adjustment, the feed-teeth $v$ bearing their strand or strands of yarn will be successively presented close to the shanks of the needles $a$, $a$ opposite to the spaces between adjacent needles. The feed-teeth $v$ are not projected between the needles $a$, $a$ but approach them only near enough to lay on the yarn in the manner already described in connection with the combined yarn-guide and yarn-feed A. A main needle presser-wheel may conveniently be associated with the feed wheel E in the manner shown at J, Fig. 18.

In the modification illustrated in Figs. 20, and 21, a feed-wheel F is mounted similarly to the wheel E, and comprises a series of blades $w$ (one of which is shown in Fig. 19), which are arranged to revolve about a common center and to have a radial movement which causes them to approach and recede from the main needles $a$, $a$. To this end they are mounted to slide in radial grooves in the rotating wheel E and are reciprocated by stationary cams 28 and 29, which act upon the nibs of the blades (see Figs. 20 and 21). Thus as the rotation of the wheel F carries the blades around, they are maintained constantly under the influence of the cams 28 and 29 so that, as they approach the needles they are thrust radially outward and as they pass the needles they are withdrawn again. The cams 28 and 29 are so formed that the ends of the blades $w$, when they have been protruded at the proper moments, will lie in an arc of a circle which is of slightly greater radius than that formed by the needle shanks. Hence the ends of the protruded blades $w$ will be in close proximity to the shanks of the main needles $a$, $a$. Each blade $w$ bears upon its outer edge two yarn receiving grooves 30, either of which may be used alone in knitting from a single strand of yarn, or which may be used concurrently in knitting from two strands. The cams 28 and 29 are so adjusted that the blades $w$ will be projected toward the spaces between the main needles $a$, $a$ but they are not thrust out far enough to extend into or beyond said spaces. The manner of rotating the wheel F is conveniently similar to that of the wheel E described above. When the cylinder 1 revolves the blades $w$ will be successively thrust out close to the shanks of the needles $a$, $a$, bearing their strand or strands of yarn within their yarn-receiving grooves 30 and laying said yarn against the shanks of said main needles $a$, $a$ in the improved manner already described. The wheel F may for convenience bear a presser wheel J, as shown in Fig. 20. Yarn may be introduced to the yarn-receiving grooves in the above described feed-wheels E and F by a yarn-guide such as is shown at K in Figs. 22, 23 and 24. This guide K is equipped with two eyes $x$ and $y$ which receive and conduct the strand or strands of yarn to the feed-wheel. It is convenient to provide an obliquely disposed slot 31, entrant into each of said eyes, whereby yarn may be introduced without the inconvenience of threading through. The oblique trend of the said slots 31 effectually prevents the yarn from slipping out when once drawn into the eyes. The guide K is conveniently secured to the feed-wheel bearing 27, as shown in Figs. 18 and 20. The above described feed-wheels E and F, together with the guide K, may be used interchangeably for knitting with one or with two strands of yarn without necessitating any alteration whatever in their construction or adjustment.

In the subjoined claims the employment of certain designating terms used in the preceding description is to be regarded as matter of designation and not of limitation, since the forms and constructions of the several parts can be widely varied without departing from the principles of the invention. Likewise in the subjoined claims words denoting direction and motion are to be regarded as terms of designation and not of limitation, since it is obvious that relative movement is alone of importance and that the particular direction is due to the position in which the particular machine is placed.

I claim as my invention,—

1. A knitting machine having, in combination, main spring bearded needles, ribbing spring bearded needles in a plane substantially at right angles to that of the main needles, knitting-cams for said sets of needles respectively, and a yarn-feed which lays the yarn against the shanks of the main needles only below the points of their beards and above the plane of the ribbing needles and without looping it between said needles, the yarn being looped solely by the subsequent passage of the main needles between the ribbing needles.

2. A knitting machine having, in combination, main spring bearded needles and ribbing spring bearded needles in different planes substantially at right angles to each other, knitting-cams for said sets of needles respectively, and a yarn-feed having two in-leading yarn eyes one above the other and both close to the shanks of the main needles whereby the yarns are both laid one above the other against the shanks of the main needles below the points of their beards, and are looped solely by the passage of the main needles through the spaces between the ribbing needles.

3. A knitting machine having, in combination, main spring bearded needles, ribbing spring bearded needles in a plane crossing that of the main needles, knitting-cams for said sets of needles respectively, and a yarn-feed which lays the yarn against the shanks of the main needles only below the points of their beards and above the plane of the ribbing needles and without looping it between said needles, the yarn being looped solely by the subsequent passage of the main needles between the ribbing needles.

4. A knitting machine having, in combination, bearded needles, a carrier and knitting cams therefor, a stationary yarn-feed, a normally stationary presser beneath said yarn-feed, and a main needle support beneath said presser and in front of said main needles, said support holding said needles from movement away from said carrier.

5. A knitting machine having, in combination, main bearded needles, ribbing needles, carriers and knitting cams therefor, respectively, a yarn-feed, a presser and a main needle support in front of said main needles to support them during the advance of the ribbing needles and to hold them from movement away from their carrier.

6. A knitting machine having, in combination, main needles, ribbing needles, knitting cams for said sets of needles respectively, a post, a stationary yarn-feed upon said post, a yielding presser upon said post and beneath said yarn-feed, and a main needle support upon said post and beneath said yielding presser.

7. A knitting machine having, in combination, main needles, ribbing needles, knitting cams for said sets of needles respectively, a post, a yarn-feed upon said post, a main needle presser upon said post beneath said yarn-feed, and a main needle support upon said post beneath said presser.

8. A knitting machine having, in combination, main needles, ribbing needles, knitting cams for said sets of needles, respectively, a post, a normally stationary yarn-feed upon said post, a yielding presser upon said post, said yarn-feed and said presser being susceptible of ready withdrawal from operation collectively by being rotated upon said post.

9. A knitting machine having, in combination, main spring-bearded needles, ribbing needles, knitting cams for said sets of needles respectively, a post, and a normally stationary yarn-feed upon said post, said yarn-feed being susceptible of ready withdrawal from operation by being swung horizontally upon said post away from said needles.

10. A knitting machine having, in combination, main needles, ribbing needles, knitting cams for said sets of needles respectively, a yarn-feed, a post, a yielding presser upon said post, and a main needle support upon said post beneath said presser.

In witness whereof, I have hereunto signed my name in the presence of two subscribing witnesses.

JOHN S. CRANE.

Witnesses:
W. L. WOODWORTH,
H. W. GORRELL.